United States Patent
Wakabayashi et al.

(10) Patent No.: US 12,177,311 B2
(45) Date of Patent: Dec. 24, 2024

(54) BROKER DEVICE, PUBLISHER DEVICE, SUBSCRIBER DEVICE, PUBLISHER-SUBSCRIBER SYSTEM, PUBLISHER-SUBSCRIBER METHOD

(71) Applicant: Sony Group Corporation, Tokyo (JP)

(72) Inventors: Hideji Wakabayashi, Basingstoke (GB); Vivek Sharma, Basingstoke (GB); Yassin Aden Awad, Basingstoke (GB); Yuxin Wei, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/035,292

(22) PCT Filed: Dec. 8, 2021

(86) PCT No.: PCT/EP2021/084709
§ 371 (c)(1),
(2) Date: May 4, 2023

(87) PCT Pub. No.: WO2022/122789
PCT Pub. Date: Jun. 16, 2022

(65) Prior Publication Data
US 2024/0007544 A1    Jan. 4, 2024

(30) Foreign Application Priority Data

Dec. 9, 2020 (EP) .................................. 20212742

(51) Int. Cl.
*H04L 67/55* (2022.01)
*H04L 67/12* (2022.01)
*H04L 67/562* (2022.01)

(52) U.S. Cl.
CPC .............. *H04L 67/55* (2022.05); *H04L 67/12* (2013.01); *H04L 67/562* (2022.05)

(58) Field of Classification Search
CPC combination set(s) only.
See application file for complete search history.

(56) References Cited

U.S. PATENT DOCUMENTS 8,954,598 B2 * 2/2015 Kampmann .......... H04L 65/611
370/312
10,944,638 B1 * 3/2021 Chamarajnager ... H04W 40/246
(Continued)

FOREIGN PATENT DOCUMENTS

WO    2018/112327 A1    6/2018
WO    2020/112793 A2    6/2020

OTHER PUBLICATIONS

International Search Report and Written Opinion mailed on Apr. 12, 2022, received for PCT Application PCT/EP2021/084709 filed on Dec. 8, 2021, 9 pages.
(Continued)

*Primary Examiner* — Schquita D Goodwin
*Assistant Examiner* — Linh T. Nguyen
(74) *Attorney, Agent, or Firm* — XSENSUS LLP

(57) ABSTRACT

A broker device for an internet-of-things network, the broker device including circuitry having a communication interface, the circuitry being configured to communicate with one or more publisher devices and with a plurality of subscriber devices via the communication interface, wherein the circuitry is further configured to: receive published data from a publisher device of the one or more publisher devices that is registered as a publisher for a data category at the broker device, wherein the published data includes data payload and a data identifier indicating the data category of the data payload; and transmit at least the data payload of the received published data to at least one subscriber device of the plurality of subscriber devices that is registered as a subscriber for the data category at the broker device.

13 Claims, 7 Drawing Sheets

(56) References Cited

U.S. PATENT DOCUMENTS

| | | | |
|---|---|---|---|
| 11,089,114 B1* | 8/2021 | Saalfeld | H04L 43/103 |
| 11,366,865 B1* | 6/2022 | Kuo | H04L 12/2809 |
| 2015/0117245 A1* | 4/2015 | Zhang | H04W 72/21 |
| | | | 370/252 |
| 2016/0248871 A1* | 8/2016 | Seed | H04L 61/4511 |
| 2016/0366111 A1* | 12/2016 | Smith | H04L 63/102 |
| 2017/0006030 A1* | 1/2017 | Krishnamoorthy | H04L 63/10 |
| 2017/0295245 A1* | 10/2017 | Battini | H04L 67/55 |
| 2017/0359237 A1* | 12/2017 | Hao | G06F 21/44 |
| 2018/0167476 A1* | 6/2018 | Hoffner | H04L 67/55 |
| 2019/0095505 A1* | 3/2019 | Young | G06Q 10/0833 |
| 2019/0166640 A1* | 5/2019 | Wei | H04W 72/52 |
| 2019/0289091 A1* | 9/2019 | Burns | H04L 67/562 |
| 2020/0067865 A1* | 2/2020 | Jiménez | H04L 51/216 |
| 2020/0169548 A1* | 5/2020 | Yin | H04W 12/03 |
| 2022/0155992 A1* | 5/2022 | Nortman | G06F 9/544 |
| 2022/0353247 A1* | 11/2022 | Bastos | H04L 63/0428 |

OTHER PUBLICATIONS

3GPP, "Proximity-based services (ProSe); Stage 2 (Release 13)", 3GPP TS 23.303 V13.3.0, Mar. 2016, pp. 1-124.

"Publish-subscribe pattern", Wikipedia, Available Online at: https://en.wikipedia.org/wiki/Publish%E2%80%93subscribe_pattern, Retrieved from net on: Aug. 12, 2020, pp. 1-5.

Vivo Mobile Communication Ltd et al., "New WID on Study on Personal IoT networks", 3GPP SA WG1 Meeting #90-e, S1-202287, May 18-22, 2020, 3 pages.

* cited by examiner

70

71

| publisher device identifier | publisher identifer |
|---|---|
| Door Sensor | pub-1 |
| Door Camera | pub-2 |
| Temperature Sensor IN | pub-3 |
| Temperature Sensor OUT | pub-4 |
| ... | ... |

72

| publisher identifier | data identifier |
|---|---|
| pub-1 | Door-Status |
| pub-2 | Door-Video |
| pub-3 | Periodic-T-Data-IN |
| pub-4 | Periodic-T-Data-OUT |
| ... | ... |

73

| data identifier | metadata |
|---|---|
| Door-Status | Door Open/Closed; event driven on status change |
| Door-Video | Video; event driven on/off |
| Periodic-T-Data-IN | Temperature IN; periodic data |
| Periodic-T-Data-OUT | Temperature OUT; periodic data |
| ... | ... |

74

| subscriber device identifier | subscriber identifier | sleep state support |
|---|---|---|
| Heater | sub-1 | false |
| Air-Conditioner | sub-2 | false |
| Door Camera | sub-3 | true |
| Smartphone | sub-4 | true |
| ... | ... | ... |

75

| subscriber identifier | data identifier |
|---|---|
| sub-1 | Door-Status; Periodic-T-Data-IN; Periodic-T-Data-OUT |
| sub-2 | Door-Status; Periodic-T-Data-IN; Periodic-T-Data-OUT |
| sub-3 | Door-Status |
| sub-4 | Door-Status; Door-Video |
| ... | ... |

Fig. 8

BROKER DEVICE, PUBLISHER DEVICE, SUBSCRIBER DEVICE, PUBLISHER-SUBSCRIBER SYSTEM, PUBLISHER-SUBSCRIBER METHOD

CROSS-REFERENCE TO RELATED APPLICATIONS

The present application is based on PCT filing PCT/EP2021/084709, filed Dec. 8, 2021, which claims priority to European Patent Application No. 20212742.9, filed Dec. 9, 2020, the entire contents of each are incorporated herein by reference.

TECHNICAL FIELD

The present disclosure generally pertains to a broker device, a publisher device, a subscriber device, a publisher-subscriber system and a publisher-subscriber method for an internet-of-things network.

TECHNICAL BACKGROUND

Generally, several generations of cellular or mobile telecommunications systems are known such as GSM ("Global System for Mobile Communications"), UMTS ("Universal Mobile Telecommunications System"), LTE ("Long Term Evolution") and the fifth generation ("5G"), which is currently put into practice and further developments are ongoing. The fifth generation is standardized under the control of 3GPP ("3rd Generation Partnership Project").

Moreover, internet-of-things ("IoT") networks are known which basically describe a network of physical objects ("things") that are embedded with sensors, software, and other technologies for the purpose of connecting and exchanging data with other devices and systems over a network such as the Internet.

However, conventional cellular support of IoT networks and architecture is based on bearer type communications.

Although there exist techniques for internet-of-things networks, it is generally desirable to improve the existing techniques.

SUMMARY

According to a first aspect the disclosure provides a broker device for an internet-of-things network, the broker device comprising circuitry including a communication interface, the circuitry being configured to communicate with one or more publisher devices and with a plurality of subscriber devices via the communication interface, wherein the circuitry is further configured to:
  receive published data from a publisher device of the one or more publisher devices that is registered as a publisher for a data category at the broker device, wherein the published data includes data payload and a data identifier indicating the data category of the data payload; and
  transmit at least the data payload of the received published data to at least one subscriber device of the plurality of subscriber devices that is registered as a subscriber for the data category at the broker device.

According to a second aspect the disclosure provides a publisher device for an internet-of-things network, the publisher device comprising circuitry including a communication interface, the circuitry being configured to communicate with a broker device via the communication interface, wherein the circuitry is further configured to:
  transmit published data to the broker device at which the publisher device is registered as a publisher for a data category, wherein the published data includes data payload and a data identifier indicating the data category of the data payload.

According to a third aspect the disclosure provides a subscriber device for an internet-of-things network, the subscriber device comprising circuitry including a communication interface, the circuitry being configured to communicate with a broker device via the communication interface, wherein the circuitry is further configured to:
  receive at least data payload of published data from the broker device at which the subscriber device is registered as a subscriber for a data category, wherein the published data includes the data payload and a data identifier indicating the data category of the data payload.

According to a fourth aspect the disclosure provides a publisher-subscriber system for an internet-of-things network, the publisher-subscriber system comprising:
  a broker device including circuitry having a communication interface configured to communicate with one or more publisher devices and a plurality of subscriber devices;
  a publisher device of the one or more publisher devices including circuitry configured to communicate with, the broker device;
  a subscriber device of the plurality of subscriber devices including configured to communicate with the broker device;
  wherein the circuitry of the publisher device is further configured to transmit published data to the broker device at which the publisher device is registered as a publisher for a data category, wherein the published data includes data payload and a data identifier indicating the data category of the data payload;
  wherein the circuitry of the broker device is further configured to
    receive the published data from the publisher device of the one or more, and
    transmit at least the data payload of the received published data to the subscriber device that is registered as a subscriber for the data category at the broker device; and
  wherein the circuitry of the subscriber device is further configured to receive at least the data payload of the published data from the broker device.

According to a fifth aspect the disclosure provides a publisher-subscriber method for an internet-of-things network, the publisher subscriber method comprising:
  receiving, at a broker device, published data from a publisher device of one or more publisher devices that is registered as a publisher for a data category at the broker device, wherein the published data includes data payload and a data identifier indicating the data category of the data payload; and
  transmitting from the broker device at least the data payload of the received published data to at least one subscriber device of a plurality of subscriber devices that is registered as a subscriber for the data category at the broker device.

Further aspects are set forth in the dependent claims, the following description and the drawings.

BRIEF DESCRIPTION OF THE DRAWINGS

Embodiments are explained by way of example with respect to the accompanying drawings, in which:

FIG. 8 schematically illustrates an embodiment of a mapping table;

DETAILED DESCRIPTION OF EMBODIMENTS

Figure 6:
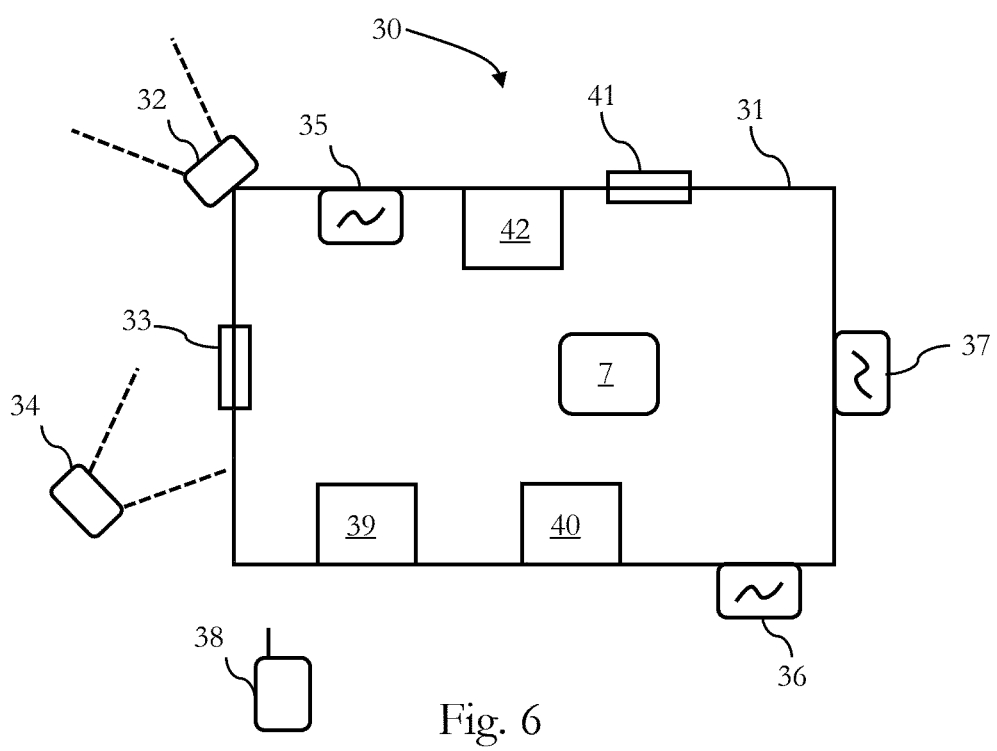
FIG. 6 schematically illustrates in a block diagram a second embodiment of a broker device for an internet-of-things network.

Before a detailed description of the embodiments under reference of FIG. 6, general explanations are made.

As mentioned in the outset, several generations of cellular or mobile telecommunications systems are known such as GSM ("Global System for Mobile Communications"), UMTS ("Universal. Mobile Telecommunications System"), LTE ("Long Term Evolution") and the fifth generation ("5G"), which is currently put into practice and further developments are ongoing. The fifth generation is standardized under the control of 3GPP ("3rd Generation Partnership Project").

Moreover, internet-of-things ("IoT") networks are known which basically describe a network of physical objects ("things") that are embedded with sensors, software, and other technologies for the purpose of connecting and exchanging data with other devices and systems over a network such as the Internet.

Herein, IoT means or includes not only concepts of machine-to-machine communications, it includes also machine-to-human communications (wearable communication) or human-to-human communications (e.g. message service).

However, conventional cellular support of IoT networks and architecture is based on bearer type communications.

Generally, in the conventional cellular IoT architecture (e.g. eMTC ("enhanced machine-type communication") or NB-IoT ("narrowband-IoT")), the communication model between user equipment ("UE") and a network/cloud (server) is one-to-one.

Figure 1:
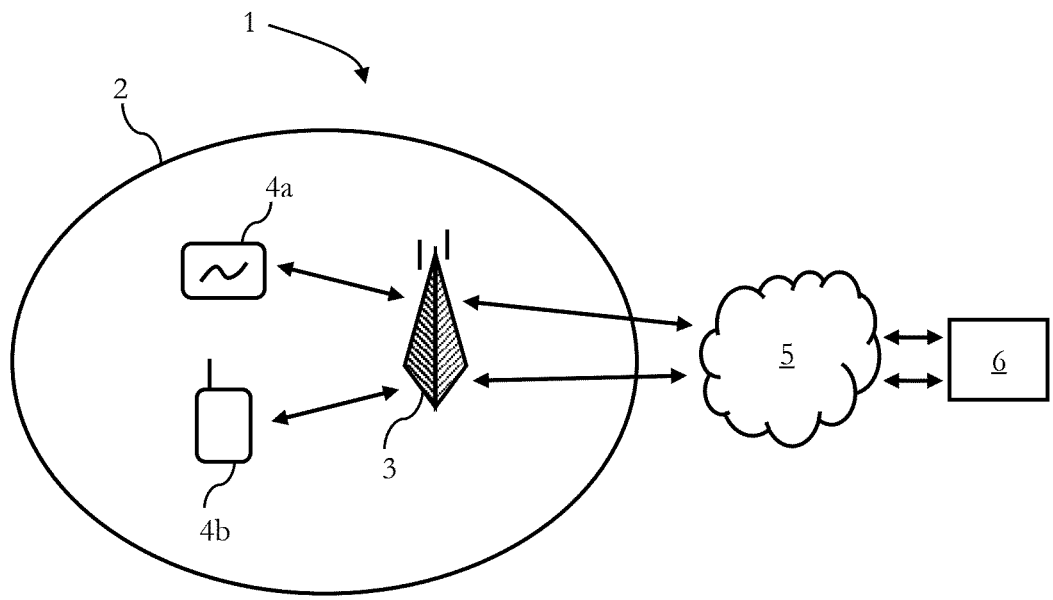
FIG. 1 schematically illustrates an embodiment of a conventional cellular internet-of-things network communication model.

FIG. 1 schematically illustrates an embodiment, of a conventional cellular IoT network communication model.

A part of a radio access network 1 ("RAN") is shown where a cell 2 is established by a base station 3 and UE 4a and UE 4b can communicate with the base station 3. For example, the UE 4a is embedded in a sensor and the UE 4b is embedded in a smartphone.

The UE 4a transmits data from the sensor via the base station 3 over cellular network/Internet 5 to a server/cloud 6. The cloud 6 stores the data from the UE 4a in a storage and optionally process it (e.g. big data analysis). When the UE 4b needs to access the stored data, the UE 4b connects to the server 6 and downloads the stored data or processed results.

However, it has been recognized that an IoT network architecture should support various types of connections and a flexible data distribution among multiple devices. Specifically, it has been recognized that IoT network architecture should support various types of connections via a broker device for an IoT network.

Figure 2:
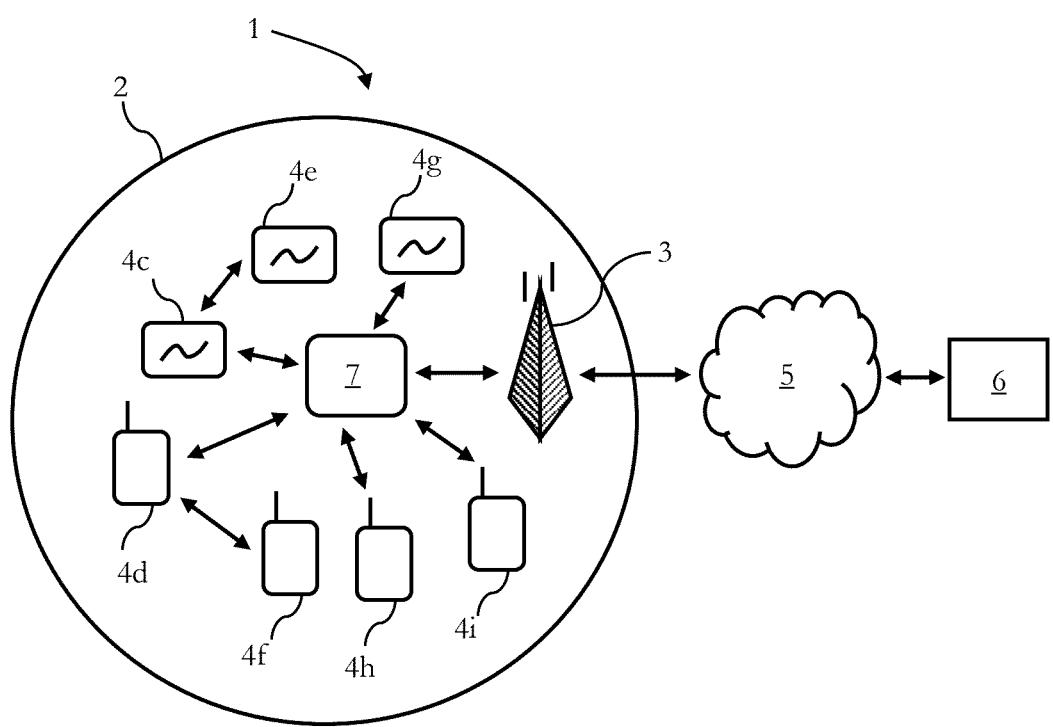
FIG. 2 schematically illustrates a first embodiment of a broker device for an internet-of-things network.

A possible architecture of an IoT network is shown in FIG. 2 which schematically illustrates a first embodiment of a broker device 7 for an IoT network.

The broker device 7 is (logically) located in the center of the IoT network. A plurality of IoT devices 4c-i directly or indirectly (i.e. multi-hopping) connect to the broker device 7. Moreover, the broker device 7 connects to the cloud 6 via (3GPP) network/Internet 5.

The broker device 7 supports a function of a relay between the IoT devices 4c-i and the cloud 6 and between an IoT device of the plurality of IoT devices 4c-i and another IoT device of the plurality of IoT devices 4c-i.

The broker device 7 provides a function of inter-wireless technologies, for example, data transfer from an IoT device 4c supporting ZIGBEE® to a UE 4d supporting device-to-device ("D2D") communication via the broker device 7. Moreover, an IoT device 4g supporting Bluetooth®, a UE supporting 3GPP (LTE/NR ("New Radio")) radio interface ("Uu") and an IoT device 4i supporting Wi-Fi® connect to the broker device 7.

It has been recognized that the IoT network should flexibly distribute data among multiple devices in the IoT network. For example, a door sensor in a home connects to an IoT network. When the door sensor detects that a door is open, the door sensor needs to indicate the status of the door to other home or personal devices in the home such as air conditioner, heater, surveillance camera, security device and the like. The information from a sensor can be shared with multiple devices for multiple purposes. Thus, it has been recognized that an architecture of communication which is suitable for this type of use cases should allow a flexible data distribution among multiple devices in the IoT network.

In order to support efficient communication for a broker device (for an IoT network) in a (3GPP) network, a publish subscriber model ("pub-sub model") is adapted for the IoT network.

Generally, the pub-sub model basically has three (logical) entities which are a publisher, a subscriber and a broker. The subscriber requests or indicates (a) data (category) or service which it requires to the broker. Typically, it is called a "topic". When the publisher sends the data (of the data category) to the broker and the broker distributes the data from the publisher to one or more subscribers which require the data (of the data category).

However, the pub-sub model is not yet supported by 3GPP which may be due to the idea that a telecom network service provides the bearer (point-to-point connection).

In contrast to the conventional point-to-point architecture, the pub-sub model allows decoupling the relation between a sender and a receiver. In the pub-sub model the relation is-flexible/changeable and predetermined/fixed relations are not required. For example, the publisher does not have to know the subscriber's destination address in advance. A subscriber may be flexibly added/deleted in the IoT network. The broker should manage the data distribution. Vice versa, the subscriber does not have to know the source address of the publisher. The subscriber simply registers the subscription of required data or service. The pub-sub model may allow in principle handling of any number of devices.

Hence, a pub-sub model architecture for an IoT network in a (3GPP) network is discussed herein.

As mentioned above, conventionally, a 3GPP network assumes bearer type communication, which is point-to-point connection between a user equipment and a core, network gateway.

Thus, it has been recognized that a data distribution via a broker may be required to adapt the pub-sub model for an IoT network in 3GPP networks.

The IoT network may require the following high-level functions to support pub-sub model:
  Discovery, assistance of finding the IoT network,
  Publisher (UE) registration to IoT network,
  Subscriber (UE) registration to IoT network, and
  Distribution of data from publisher to subscribers via a broker.

Figure 3:
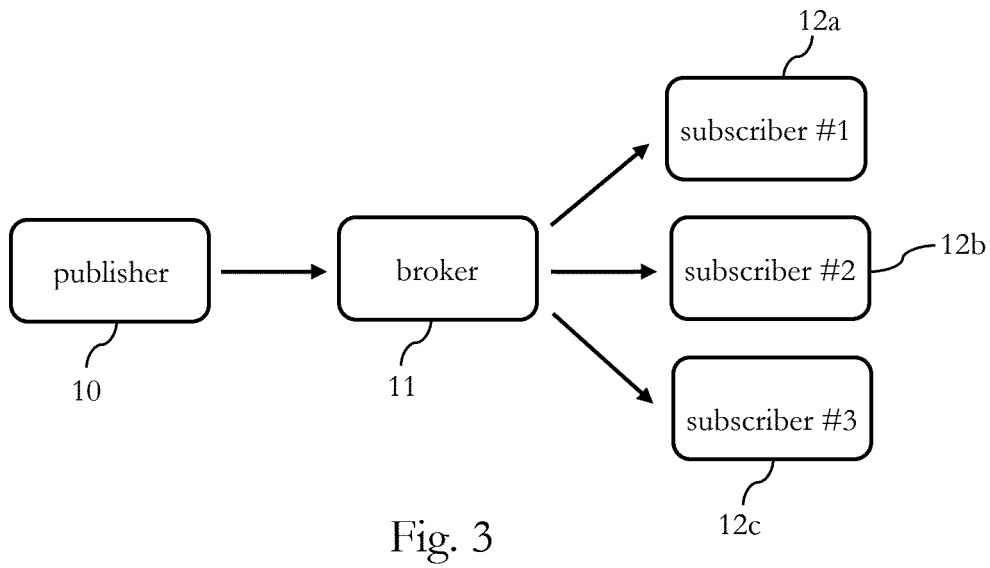
FIG. 3 schematically illustrates in a block diagram an embodiment of a publisher-subscriber model for an internet-of-things network.

FIG. 3 schematically illustrates in a block diagram an embodiment of a publisher-subscriber model for an IoT network.

There are three logical roles: a publisher 10, a broker 11 and a subscriber 12a-c. The publisher 10 associated with a publisher device transmits published data to the broker 11. The broker 11 transmits at least data payload of the published data to at least one subscriber 12a-c associated with a subscriber device.

For example, the publisher (role) 10 is associated with a wireless device such as a sensor or a data generator and the subscriber (role) 12a-c is associated with one or more home devices which use the published data from the publisher 10 via a wireless connection. The broker (role) 11 is associated with an intermediate device which supports pub-sub support functions.

Generally, there may be various ways of physical implementation of the three logical roles shown in FIG. 3. For example, a broker device supports all broker functions and supports connectivity including small cell, core network and application. For example, a smartphone may be used as a broker device. In that case, the smartphone application may support some of the broker functions.

Figure 4:
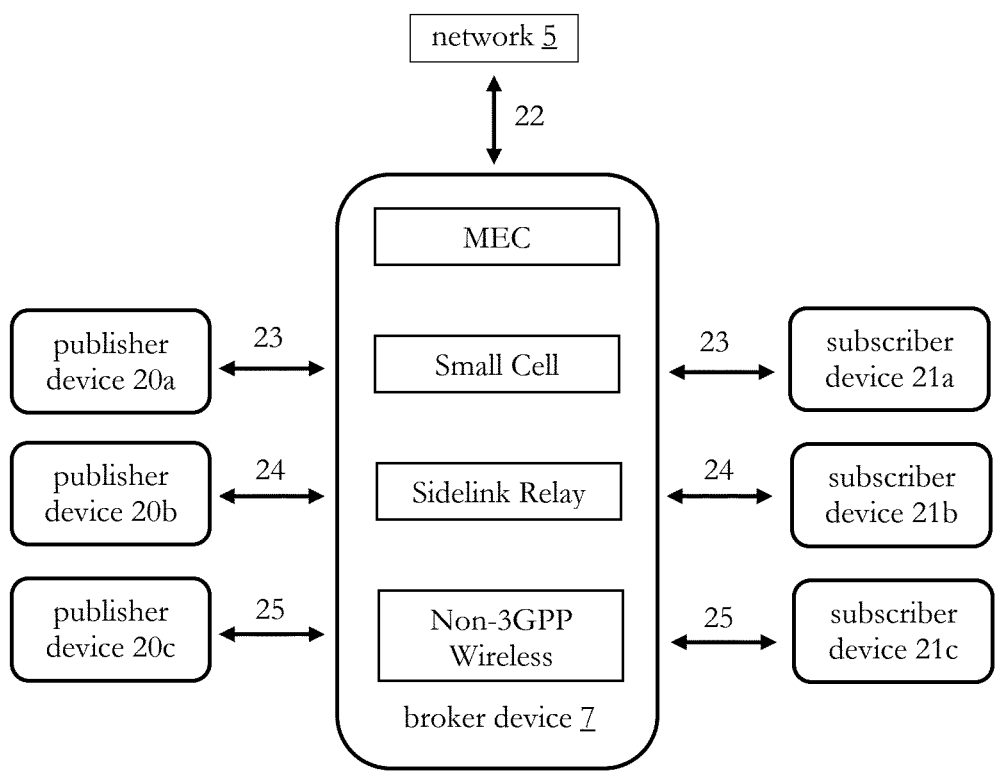
FIG. 4 schematically illustrates in a block diagram an embodiment, of physical connectivity of a broker device for an internet-of-things network.

Physical Block and Connectivity:

The physical block and the connectivity are shown in FIG. 4, which schematically illustrates in a block diagram an embodiment of physical connectivity of a broker device 7 for an IoT network.

The broker device 7 connects to a(n) (external) network 5 (i.e. telecom network) via a communication link 22 such as via air interface (Uu) or Integrated and access backhaul ("IAB"). Alternatively or additionally, in some embodiments, the broker device 7 connects via another interface such as landline Internet access (e.g. GE PON).

The broker device 7 has full broker function, which is self-sufficient model. Some of the logical broker functions may be implemented in multi-access edge computing ("MEG"), for example, coordination with non-3GPP interfaces. Alternatively, the network 5 may support virtualization/software defined network and some of the functions may be physically implemented outside of the broker device 7 in the network 5 or a cloud such as the cloud/server 6.

The broker device 7 communicates with a plurality of publisher devices 20a-c and with a plurality of subscriber devices 21a-c. The broker device 7 has a communication, interface which supports multiple communication technologies.

In terms of wireless technology support, the broker device 7 supports multiple technologies including non-3GPP standards. The broker device 7 is basically a converter/bridge from one wireless technology to another wireless technology.

In terms of 3GPP interface support, the broker device 7 supports Uu (LTE, NR) and PC5 (D2D).

The subscriber device 21a and the publisher device 20a connect to the broker device 7 via air Uu-interface 23. The broker device 7 has the Small Cell of eNB/gNB ("eNodeB"/"next-generation eNodeB") including the core network protocol. In addition, the subscriber device 21b and the publisher device 20b connect to the broker device via PC5 interface 24. The broker device 7 has Sidelink Relay.

In terms of non-3GPP interface support, the broker device 7 supports non-3GPP wireless interface such as Wi-Fi, Bluetooth, ZIGBEE and so on. The subscriber device 21c and the publisher device (may) connect to the broker device 7 with different wireless technologies 25.

Figure 5:
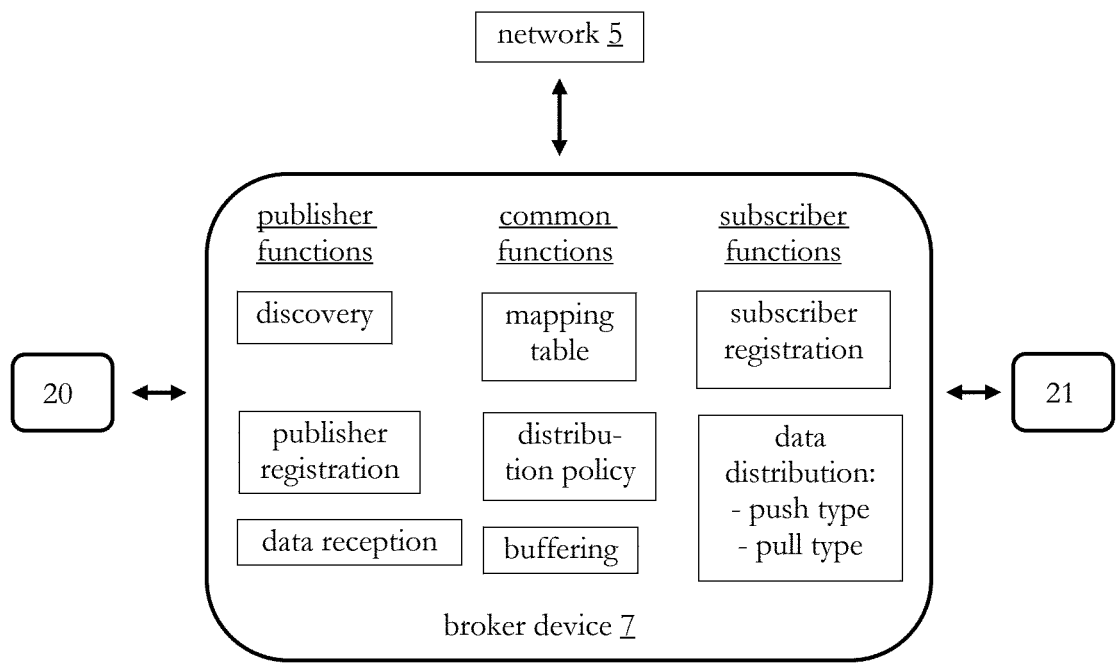
FIG. 5 schematically illustrates in a block diagram an embodiment of functions of a broker device for an internet-of-things network.

The Functional Blocks:

The functional blocks of the broker device 7 are shown in FIG. 5, which schematically illustrates in a block diagram an embodiment of functions of the broker device 7 for an IoT network.

The broker device 7 basically implements three parts: publisher (device) 20 handling (publisher functions), subscriber (device) 21 handling (subscriber functions) and common functions.

The publisher functions handle discovery of the IoT network, publisher registration and data reception.

The subscriber functions handle subscriber registration and data distribution. The data distribution function supports two types of data distribution methods, one is polling (pull) based (pull type data distribution), the other is push based (push type data distribution). Polling/Pulling means that a subscriber device 21 checks an arrival of published data in a buffer of the broker device 7 and retrieves it when relevant data (e.g. data payload of a data category the subscriber device 21 is registered for) is stored. Pushing means that the broker device 7 transmits the data to a registered subscriber device 21 when relevant data for the subscriber device 21 has arrived.

The common functions handle a mapping table that stores a relation between publisher and subscriber(s), a data distribution policy (push/pull type, priority, QoS ("Quality of Service")), a temporary buffer of data, etc.

In the following, embodiments of the functions and processes and the structure of data/information are discussed.

Publisher Functions:

a) Discovery (of IoT network): in some embodiments, the broker device transmits (e.g. broadcast) a discovery signal (message describing sub-network within a network) indicating that the IoT network is in operation to potential publisher devices.

The discovery signal (message describing sub-network within a network) may include a unique network ID (network identifier) such as personal network ID, closed subscriber group (CSG) ID, sidelink source ID, service set identifier (SSID) of Personal Area Network identifiers (PAN ID) in ZIGBEE and the like.

The discovery signal may transmit the broadcast method such as system information of NR, discovery signal of 3GPP sidelink and the like.

When a publisher device detects the discovery signal of the IoT network, it may start the registration at the broker device.

This process may be omitted if the IoT network is pre-configured (e.g. configuration is stored in SIM card).

b) Publisher registration: in some embodiments, the publisher device may transmit a publisher registration request including a publisher device identifier for registering as a publisher for a data category. Generally, a data category of a data payload (e.g. sensor data) indicates common characteristics or features of the data payload. The data category of the data payload may be indicated by a data identifier. The publisher registration request may include a list of supported communication technologies or interfaces (e.g. Uu, Wi-Fi, etc.). The list may be stored in a mapping table when registered.

The broker device may authenticate, in response to the publisher registration request, the publisher device which requested to register as a publisher.

Once authenticated the broker device may issue a publisher identifier.

When the publisher device receives the publisher identifier, it may send the metadata (information on generated data payload) to the broker device. Generally, the metadata describe or characterize or define the data category of the data payload and allow to issue a data identifier that indicates the data category of the data payload. The metadata may support selection of the subscription of data for subscriber devices. The metadata may suggest to the broker device how to distribute the data payload.

The metadata may include:
a name of the data payload (e.g. "T" if the publisher device is a temperature sensor);
a name of a topic or category of the data payload (e.g. "temperature data");
information structure and semantics (it may be defined by another specification);
a data generation period or preferable delivery schedule (or aperiodic, event driven, etc.);
a required QoS ("Quality of Service", e.g., whether time sensitive network ("TSN") is required, latency, reliability, delay, etc.);
terms and conditions for subscription-(restriction of subscriber, charged data or free of charge);
security information.

The broker device may issue the data identifier (e.g. "periodic temperature data") corresponding to the metadata. The publisher device includes the data identifier when it transmits the data payload to the broker device. The publisher identifier is a unique id for a publisher device. The number of data identifiers may be more than one if a publisher device generates different type of data payload. The data identifier could be called topic identifier. Generally, in a publisher-subscriber context a data distinctive may be called, a topic and accordingly the data identifier may be called a topic identifier.

c) Data reception (from the publisher device to the broker device):
The broker device receives the published data from the registered publisher device, wherein the published data include the data payload and the data identifier indicating the data category of the data payload. The published data may include the publisher identifier.

The broker device may store the published data in a buffer.

The broker device distributes at least the data payload to registered subscribers (further discussed below).

Common Functions:
The broker device stores or keeps a mapping table.

a) Mapping table: the mapping table may generally be used for identifying and registering the subscribers and publishers at the broker device and for identifying the subscribers for the data category of a data payload received from a publisher. Generally, the mapping table may be a kind of database for keeping the relation between a publisher and a subscriber(s).

The mapping table may store the relation between the publisher identifier and the publisher device identifier.
It may store the relation between the data identifier and the metadata.
It may store the relation between the publisher identifier and the data identifier. The broker device may register the publisher device as a publisher for the data category by storing the relation between the publisher identifier and the data identifier.
It may store the relation between the subscriber identifier and the subscriber device identifier.
It may store the relation between the subscriber identifier and the data identifier. It may store the relation between the subscriber identifier, the data identifier and the publisher identifier.
It may store the relation between the data identifier and the data distribution policy.
It may store the history of subscription like received data and data volume for the purpose of charging.

b) Data distribution policy function: the distribution policy may store the requirements of data distribution and related information to support data distribution. The broker may distribute the data based on it.
It may store a requirement for data distribution (e.g. latency, reliability, TSN support and the like).
It may store whether data is periodic data or aperiodic data.
It may store whether polling (pull) type data distribution or push type data distribution is supported.

c) Buffer: the buffer may temporarily store the published data from the publisher device because there may be some delay between data reception from the publisher device and the data distribution to the subscriber(s). In some embodiments, the data payload or the published data is received/transmitted based on synchronous communication (real-time) or based on asynchronous communication (time delay/lag). In some embodiments, the broker device includes a buffer storage configured to temporarily store data payload or published data from one or more publisher devices. Generally, a large buffer may support for asynchronous operation, which has a time lag between sender and receiver (e.g. polling).

Subscriber Functions:
a) Subscriber registration: the broker device may generate assistance information of a data category (advertisement of published data for potential subscribers) available for distribution based on the received metadata corresponding to the data category. The assistance information includes the data identifier and at least one characteristic selected from the received metadata.

The broker device may transmit the assistance information of published data (e.g. data identifier and period of data generation) to a plurality of subscriber devices (potential subscribers).

The broker device may transmit the message describing sub-network within a network indicating that the IoT network is in operation to the plurality of subscriber devices.

A subscriber device may receive the message describing sub-network within a network (e.g. network discovery signal).

A subscriber device may receive the assistance information:

If the subscriber device detects a required data category based on the assistance information, the subscriber device may transmit a subscriber registration request for registering as a subscriber for the data category to the broker device.

The subscriber registration request may include a subscriber device identifier, the requested data category, i.e. the data identifier, and may further include an additional condition for data reception (e.g. not allowed to use push type communication) and an indication whether the subscriber device supports a sleep-state. The subscriber registration request may include a list of supported communication technologies or interfaces (e.g. Uu, Wi-Fi, etc.). The list may be stored in the mapping table when registered.

The broker device may authenticate the subscriber device.

Once authenticated, the broker device may issue a subscriber identifier. The subscriber identifier is, unique for a subscriber device.

The broker device may register the authenticated subscriber device as a subscriber for the data category. The broker device may register the subscriber device as a subscriber for the data category by storing the data identifier and the subscriber identifier in association with each other as the relation between the data category and the subscriber for the data category in the mapping table.

b) Data distribution:

The broker device may determine a wireless interface (e.g. D2D, Wi-Fi, ZIGBEE and the like) based on the mapping table:

If the subscriber device supports sidelink (PC5), the broker device may broadcast or groupcast the data payload to the subscriber devices.

If the subscriber device supports Uu, the broker device may transmit the data payload with unicast communication.

The broker device may select a type of data distribution based on the data distribution policy.

Based on subscriber's preference.

Based on publisher's preference.

Push or pull type communication.

Optionally, the subscriber device may transmit back to the broker device a confirmation of successful data distribution.

In the following embodiments of the push type data distribution and the pull type data distribution is discussed.

The broker device may use of 3GPP functions (e.g. paging, WUS ("wake-up signal")) for efficient communication and power saving.

Push type data distribution:

If the subscriber device has a capability of sleeping (supporting a sleep state; e.g. power saving for stand-by), the broker device may transmit the wake-up signal (WUS) or paging message to the subscriber devices and afterwards the broker device transmits the data payload.

When periodic data generation or arrival is configured, the subscriber device wakes up the same time window with a (predetermined) periodicity. The broker device transmits buffered data to the subscriber device(s) in line with time window of periodicity.

Push type communication may support group indication. For example, the broker device transmits a wake-up signal for multiple subscriber devices which belong to the same group. In case of periodic transmission, multiple subscriber devices may have the same timing pattern of wake-up and simultaneously receive the same data payload from the broker device.

Polling (pull) type data distribution:

The subscriber device may regularly check a buffer status of the broker device whether the published data/data payload of subscribed data category is ready or not and retrieve it when it is ready (e.g. instruct the broker device to transmit it). Alternatively, the broker device may broadcast the buffer status whether the published data/data payload of subscribed data category is ready or not.

The subscriber device may request the data payload from the broker device if the data has been arrived in the buffer.

The broker device may transmit the data payload to the requesting subscriber device.

Generally, a publisher-subscriber model for an IoT network is discussed herein. A broker device for the IoT network may connect publisher and subscriber devices with various types of wireless (and wired) communication technologies such as 3GPP sidelink, LTE/NR Uu, Wi-Fi, Bluetooth, ZIGBEE and the like. The publisher-subscriber model may support a flexible relation between a sender (publisher) and at least one receiver(s) (subscriber) instead of conventional point-to-point (bearer) communication model. It may support easy sharing of data among multiple subscriber devices which require published data.

Compared to the conventional IoT network, the data transmission may be more efficient. In conventional IoT networks, even when two terminals are located very close, the data is sent to the core network once and then the data is received from the core network. The publisher-subscriber architecture may avoid this overhead.

Moreover, compared to the conventional sidelink communication, it may be more suitable for IoT applications. Typically, the sidelink requires the ProSe pre-configuration in advance. On the other hand, IoT applications may require adding and deleting of devices later. The publisher-subscriber architecture may provide a flexibility and minimize reconfiguration.

Figure 7:
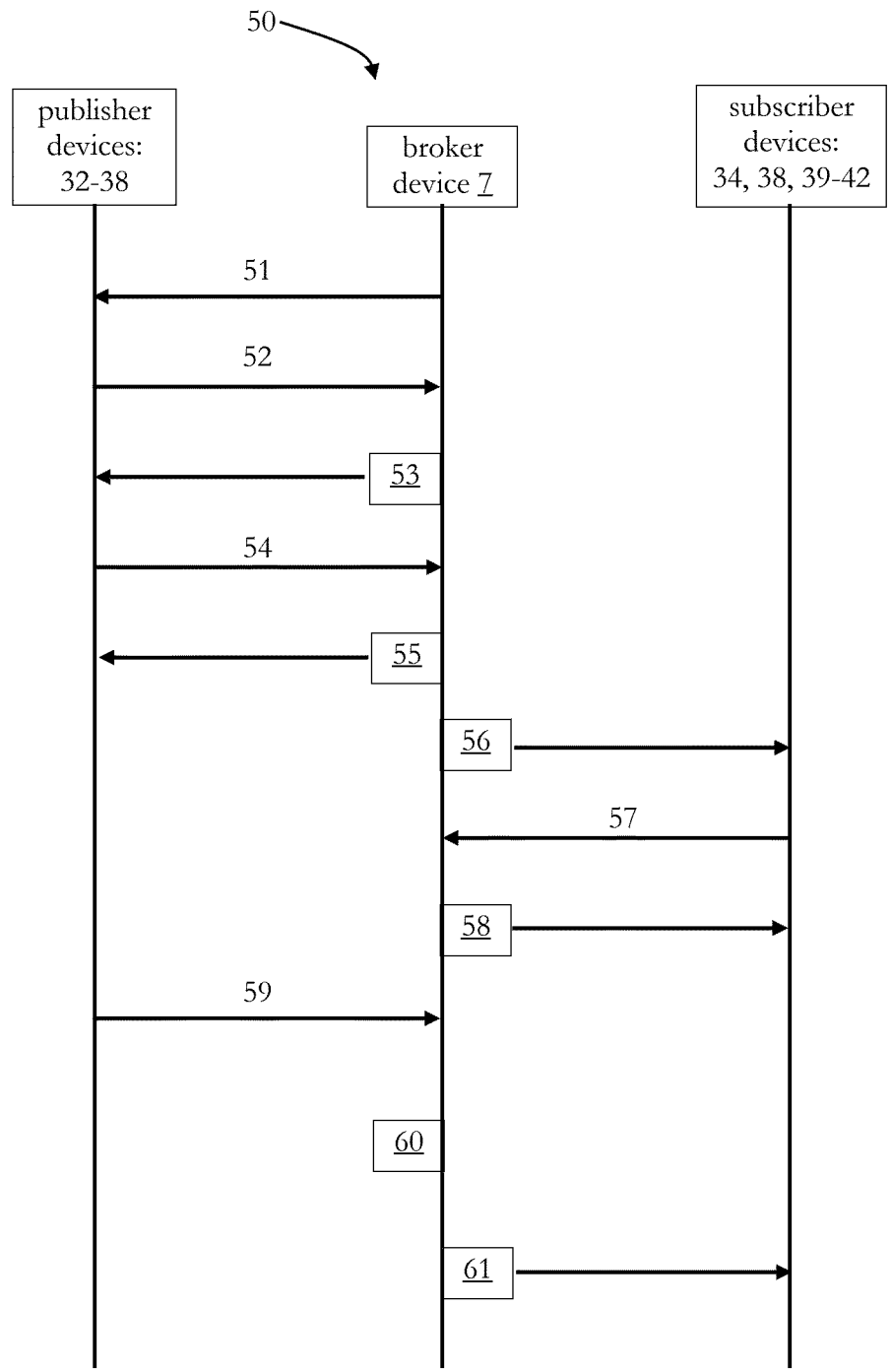
FIG. 7 schematically illustrates in a flow diagram an embodiment of a publisher-subscriber method for an internet-of-things network.

Returning to FIG. 6, in which FIG. 6 schematically illustrates in a block diagram a second embodiment of a broker device 7 for an IoT network 30. FIG. 7 schematically illustrates in a flow diagram an embodiment of a (corresponding) publisher-subscriber method 50 for the IoT network 30. FIG. 8 schematically illustrates an embodiment of a mapping table 70 kept at the broker device 7.

The second embodiment of the broker device 7 and the corresponding publisher-subscriber method are discussed under reference of FIGS. 6, 7 and 8 in the following.

The IoT network 30 corresponds to a smart home network or home IoT network illustrated here for a room 31.

The IoT network 30 includes the broker device 7, and IoT devices 32-42 which include a motion detector 32, a door sensor 33, a (surveillance) camera 34, a first temperature sensor 35 inside the room 31, a second temperature sensor 36 outside the room 31 (or outside of a house in which the room 31 is located), a light sensor 37 outside the room 31, a smartphone 38 of a user (which is a user living in the room 31), a heater 39, an air-conditioner 40, a window with window blinds 41 and a lighter 42.

Each of the IoT devices 32-42 can communicate with the broker device 7 and with each other via the broker device 7.

Here, the IoT devices 32-38 are publisher devices (such as the (general) publisher device 20 shown in FIG. 5). The IoT devices 34, 38 and 39-42 are subscriber devices (an IoT device may have a publisher and a subscriber role such as the camera 34 and the smartphone 38).

The motion detector 32 generates data payload indicating whether a person or vehicle or the like is detected in the vicinity of the room 31.

The door sensor 33 generates data payload indicating whether a door to the room 31 is open or closed.

The camera 34 generates (video) data payload indicating a representing a video stream of a space in a vicinity of the door to the room 31. The camera 34 can receive data payload of the door sensor 33 for determining whether the camera 34 should transit to an ON-state for generating the (video) data payload. The camera 34 can receive a command of the smartphone 38 for determining whether the camera 34 should transit to an ON-state for generating the (video) data payload.

The first temperature sensor 35 generates data payload indicating a temperature inside the room 31.

The second temperature sensor 36 generates data payload indicating a temperature outside the room 31.

The light sensor 37 generates data payload indicating ambient light outside the room 31.

The smartphone 38 of the user generates data payload in response to a user operation on the smartphone 38 such as a command to turn on the camera 34. The smartphone 38 can receive data payload of the door sensor 33 and (video) data payload of the camera 34.

The heater 39 and the air-conditioner 40 can receive data payload of the first and the second temperature sensor 35 and 36 for controlling temperature and humidity inside the room 31. The heater 39 and the air-conditioner 40 can receive data payload of the door sensor 33 for controlling temperature and humidity inside the room 31.

The window blinds 41 can receive data payload of the light sensor 37 for determining whether the window blinds 41 should be closed. The window blinds 41 can receive a command of the smartphone 38 for determining whether the window blinds 41 should be opened or closed.

The lighter 42 can receive data payload of the light sensor 37 for determining whether the lighter 42 should be turned on, for example, when the ambient light outside the room 31 falls below a predetermined threshold. The lighter 42 can receive a command of the smartphone 38 for determining whether the lighter 42 should be turned on or off.

Accordingly, each of the subscriber devices 34, 38 and 39-42 requires a different data category. The publisher devices 32-38, the broker device 7 and the subscriber devices 34, 38 and 39-42 correspond to a publisher-subscriber system which may allow a flexible (re)configuration of data distribution in the IoT network 30.

In the following, details of the publisher-subscriber system and a corresponding publisher-subscriber method 50 will be described. The concrete publisher-subscriber relation between the publisher devices 32-38 and the subscriber devices 34, 38 and 39-42 and the functionality of the broker device 7 will be discussed exemplarily only for a subset of the publisher devices 32-38 and the subscriber devices 34, 38 and 39-42 for the sake of clarity without limiting the present embodiment in this regard.

At 51, the broker device 7 transmits a message describing sub-network within a network to the publisher devices 32-38 indicating that the IoT network 30 is in operation. The message describing sub-network within a network includes a network identifier of the IoT network 30.

At 52, for example, the door sensor 33 transmits a publisher registration request to the broker device 7 for registering as a publisher for a data category. The publisher registration request includes a publisher device identifier of the door sensor 33, which may be a String such as, for example, here "Door Sensor". The camera 34 and the first and second temperature sensor 35 and 36, for example, may transmit a corresponding request for their data category.

At 53, the broker device 7 authenticates the door sensor 33 (e.g. based on a configuration file including a list of the IoT devices 32-42 that are allowed to publish data) and issues a publisher identifier to the door sensor 33, which may be a String such as, for example, here "pub-1". Moreover, the broker device 7 stores the received publisher device identifier and the issued publisher identifier in a sub-table 71 of the mapping table 70 in association with each other.

At 54, the door sensor 33 transmits metadata to the broker device 7 which characterize the data category of the data payload published by the door sensor 33. The metadata include here, for example, a name of the data category such as a String "Door Open/Closed" and a delivery schedule of the data payload which is here a String "event driven on status change" indicating that the data payload is transmitted when the door sensor 33 detects that the door is opened or closed.

At 55, the broker device 7 issues, based on the received metadata, a data identifier to the door sensor 33. The data identifier indicates the data category of the data payload of the door sensor 33 which is here, for example, a String "Door-Status". Moreover, the broker device 7 stores the publisher identifier and the issued data identifier in a sub-table 72 of the mapping table 70 in association with each other. Furthermore, the broker device 7 stores the issued data identifier and the received metadata in a sub-table 73 of the mapping table 70 in association with each other, thereby registering the door sensor 33 as a publisher at the broker device for the data category.

At 56, the broker device 7 generates assistance information and transmits the message describing sub-network within a network and the assistance information to the subscriber devices 34, 38 and 39-42. The assistance information includes the data identifier and at least one characteristic selected from the received metadata. Here the assistance information is thus the data identifier "Door-Status" and the delivery schedule "event driven on/off".

At 57, for example, the camera 34 transmits a subscriber registration request to the broker device 7 for registering as a subscriber for the data category indicated by the data identifier. The subscriber registration request includes a subscriber device identifier, the data identifier and a Boolean value indicating that a sleep state is supported. The subscriber device identifier may be a String such as, for example, here "Door Camera". The smartphone 38, the heater 39 and the air-conditioner 40, for example, may transmit a corresponding request, for the data category.

At 58, the broker device 7 authenticates the camera 34 (e.g. based on a configuration file including a list of the IoT devices 32-42 that are allowed to receive published data) and issues a subscriber identifier to the camera 34, which may be a String such as, for example, here "sub-3". Moreover, the broker device 7 stores the received subscriber device identifier, the issued subscriber identifier and the sleep state indication in a sub-table 74 of the mapping table 70 in, association with each other. Furthermore, the broker device 7 stores the subscriber identifier and the data identifier in a sub-table 75 of the mapping table 70 in in association with each other as a relation between the data category and the subscriber for the data category, thereby registering the camera 34 as a subscriber at the broker device 7 for the data category. Additionally, the broker device 7 determines a data distribution policy for the data category, for example, the broker device 7 determines for the data identifier "Door-Status" that a push type data distribution is used. The broker device 7 stores the data identifier and the data distribution policy in a sub-table (not shown) of the mapping table 70 in association with each other.

At 59, the door sensor 33 detects that the door is opened and generates a data payload indicating that the door is open. Moreover, the door sensor 33 transmits published data to the broker device 7. The published data including the data payload and the data, identifier ("Door-Status").

At 60, the broker device 7 receives the published data from the door sensor 33.

At 61, the broker device 7 transmits, based on the mapping table 70 kept at the broker device 7, at least the data payload of the received published data to the camera 34, the heater 39 and the air-conditioner 40.

As mentioned above, the procedure is only exemplarily discussed for the door sensor 33 and the camera 34, but the procedure is similar, e.g., for the camera 34 as a publisher, the first and second temperature sensor 35 and 36 as publishers of periodically-delivered temperature data and for the smartphone 38, the heater 39 and the air-conditioner 40 as subscribers. As can be seen, the corresponding information is also stored in the mapping table 70 in the sub-tables 71-75.

Figure 9:
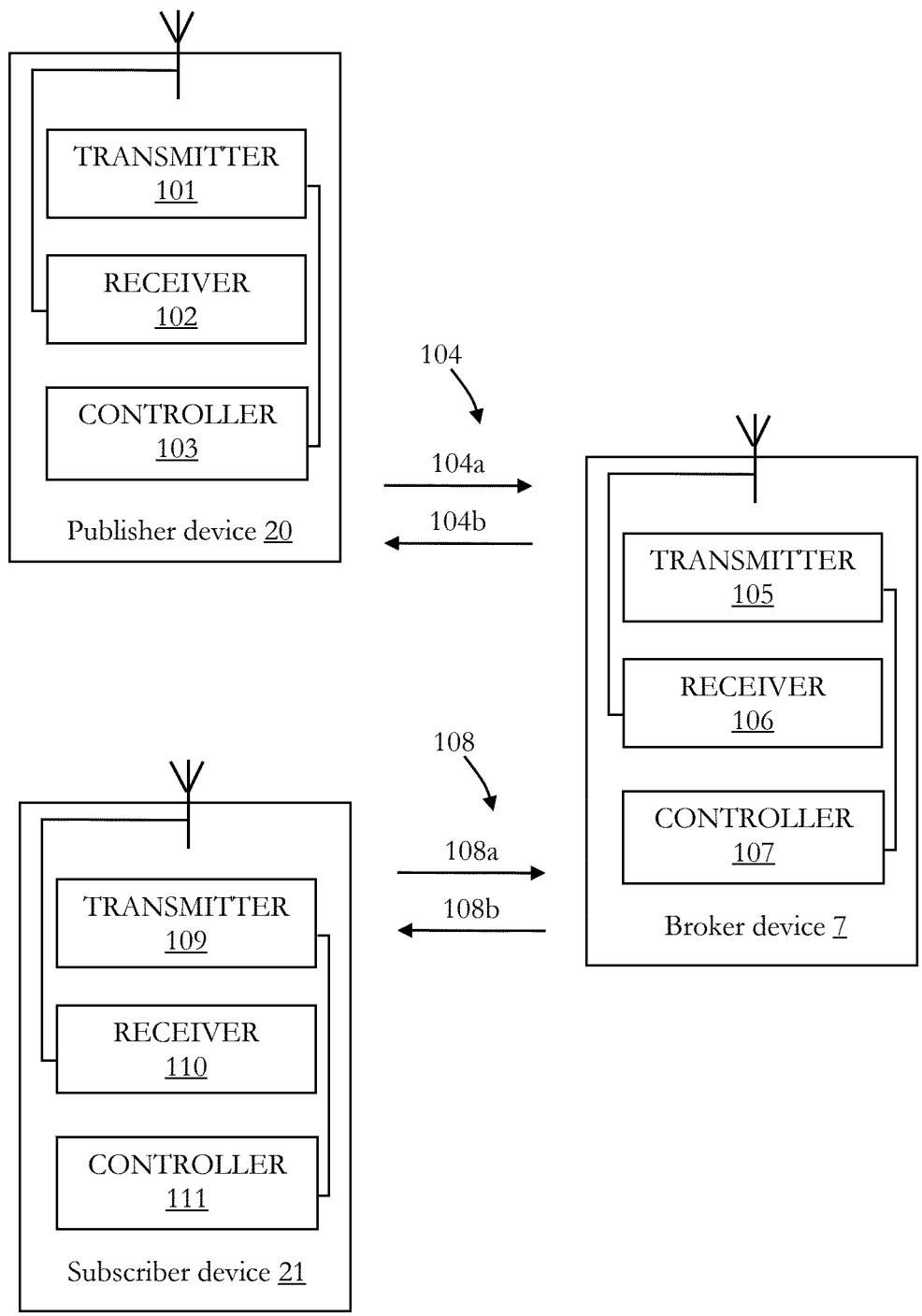
FIG. 9 schematically illustrates an embodiment of a broker device, a publisher device and a subscriber device for an internet-of-things network.

An embodiment of a publisher device 20, a broker device 7, a communication path 104 between the publisher device 20 and the broker device 7, a subscriber device 21, a communication path 108 between the broker device 7 and the subscriber device, which is used for implementing embodiments of the present disclosure, is discussed under reference of FIG. 9.

The publisher device 20 has a transmitter 101, a receiver 102 and a controller 103, wherein, generally, the technical functionality of the transmitter 101, the receiver 102 and the controller 103 are known to the skilled person, and, thus, a more detailed description of them is omitted.

The broker device 7 has a transmitter 105, a receiver 106 and a controller 107, wherein also here, generally, the functionality of the transmitter 105, the receiver 106 and the controller 107 are known to the skilled person, and, thus, a more detailed description of them is omitted.

The communication path 104 has an uplink path 104*a*, which is from the publisher device 20 to the broker device 7, and a downlink path 104*b*, which is from the broker device 7 to the publisher device 20.

During operation, the controller 103 of the publisher device 20 controls the reception of downlink signals over the downlink path 104*b* at the receiver 102 and the controller 103 controls the transmission of uplink signals over the uplink path 104*a* via the transmitter 101.

Similarly, during operation, the controller 107 of the broker device 7 controls the transmission of downlink signals over the downlink path 104*b* over the transmitter 105 and the controller 107 controls the reception of uplink signals over the uplink path 104*a* at the receiver 106.

The broker device 7 can communicate with the subscriber device 21 via the communication path 108, which can be provided by a network interface typically used for such a communication. As such a communication over a network interface is known to the skilled person, a more detailed, description of it is omitted.

Figure 10:
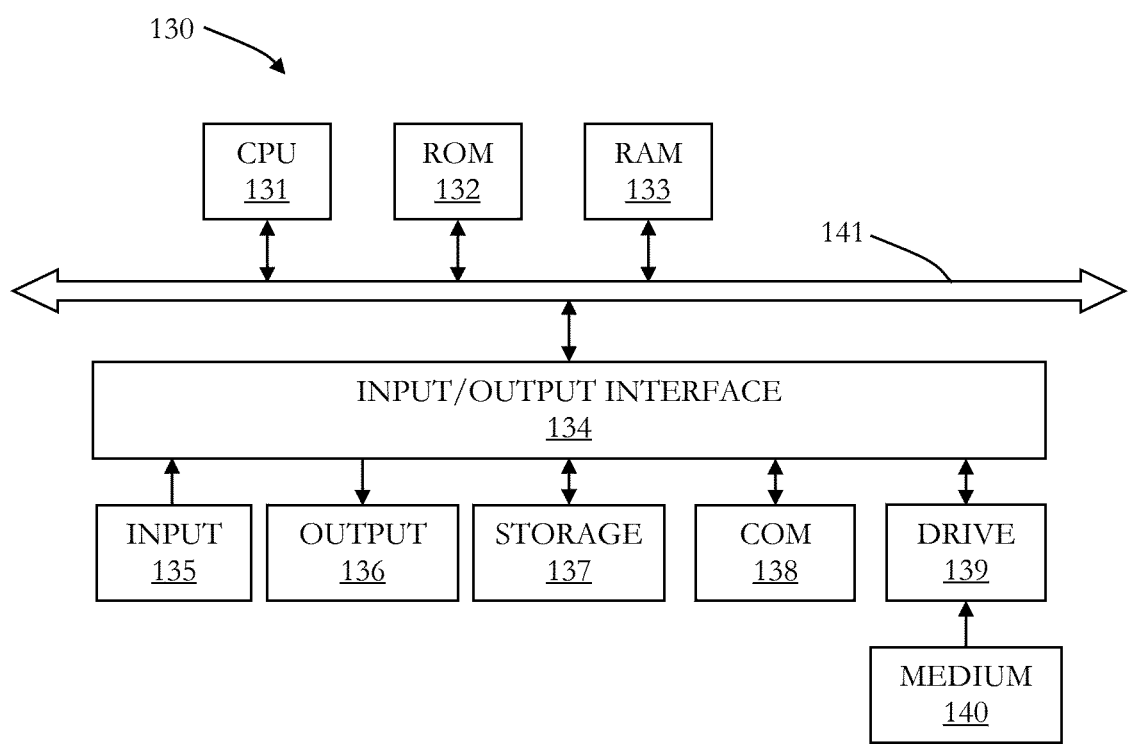
FIG. 10 schematically illustrates in a block diagram an embodiment of a general-purpose computer for implementing a broker device, a publisher device and a subscriber device for an internet-of-things network.

FIG. 10 illustrates in a block diagram a multi-purpose computer 130 which can be used for implementing a publisher device, a broker device and a subscriber device.

The computer 130 cam be implemented such that it can basically function as any type of publisher device, broker device and subscriber device as described herein. The computer has components 131 to 141, which can form a circuitry, such as any one of the circuitries of the broker device, and publisher or subscriber devices, and the like as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with, a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a broker device, a publisher device or as a subscriber device.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, ZIGBEE, infrared, etc. as described herein.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a broker device, the communication interface 138 can further have a respective air interface (providing e.g. E-UTRA protocols OFDMA (downlink) and SCFDMA (uplink)) and network interfaces (implementing for example protocols such as S1-AP, GTPU, S1-MME, X2-AP, or the like). The computer 130 is also implemented to transmit data in accordance with TCP.

Moreover, the computer 130 may have one or more antennas and/or an antenna array. The present disclosure is not limited to any particularities of such protocols.

In the following further embodiments are discussed.

Some embodiments pertain to a broker device for an internet-of-things network, the broker device including circuitry including a communication interface, the circuitry being configured to communicate with one or more publisher devices and with a plurality of subscriber devices via the communication interface, wherein the circuitry is further configured to:
- receive published, data from a publisher device of the one or more publisher devices that is registered as a publisher for a data category at the broker device, wherein the published data includes data payload and a data identifier indicating the data category of the data payload; and
- transmit at least the data payload of the received published data to at least one subscriber device of the plurality of subscriber devices that is registered as a subscriber for the data category at the broker device.

Generally, the IoT network may include machine-to-machine communications (e.g. between a sensor and an actuator or the like), machine-to-human communications (wearable communications, e.g., communications of wearable devices such as a smart watches, smart glasses, body sensors, etc. with and over a smartphone of a user) and human-to-human communications (e.g. messaging service). Examples of IoT networks include a smart home network (for example, as discussed under reference of FIGS. 6, 7 and 8), a smart factory network, a network of (personal) wearable devices, etc.

The broker device may be an IoT hub which, distributes data between publisher and subscribers in accordance with a publisher-subscriber model as described herein.

The publisher device may be an actuator, a sensor, a smartphone, a wearable device, a factory machine, etc.

The subscriber device may be an actuator, a sensor, a smartphone, a wearable device, a factory machine, etc.

The circuitry of the broker device may include at least one of: a processor, a microprocessor, a dedicated circuit, a memory, a storage, a radio interface, a wireless interface, a network interface, or the like, e.g. typical electronic components to achieve the functions as described herein (for example, as discussed under reference of FIG. 10). The communication interface may include at least one of the radio interface, the wireless interface and the network interface supporting at least one of the communication technologies as described herein (for example, as discussed under reference of FIG. 4).

The data payload or the published data may be transmitted to the at least one subscriber device of the plurality of subscriber devices based on a user defined function, a pre-definition with an implicit rule, a mapping table kept at the broker device or on server or the like, etc.

In some embodiments, at least the data payload of the received published data is transmitted to the at least one subscriber device of the plurality of subscriber devices based on a mapping table kept at the broker device, wherein the mapping table stores at least a relation between the data category and the subscriber for the data category. An embodiment of the mapping table is discussed under reference of FIG. 8.

In some embodiments, the circuitry of the broker device is further configured to transmit a the message describing sub-network within a network to the one or more publisher devices indicating that the internet-of-things network is in operation, wherein the message describing sub-network within a network includes a network identifier of the internet-of-things network.

In some embodiments, the circuitry of the broker device is further configured to receive, in response to transmitting the message describing sub-network within a network, a publisher registration request from the publisher device of the one or more publisher devices for registering as a publisher for the data category, wherein the publisher registration request includes a publisher device identifier.

In some embodiments, the circuitry of the broker device is further configured to authenticate, in response to receiving the publisher registration request, the publisher device of the one or more publisher devices.

In some embodiments, the circuitry of the broker device is further configured to issue, if the publisher device of the one or more publisher devices is authenticated, a publisher identifier to the publisher device of the plurality of publisher devices.

In some embodiments, the circuitry of the broker device is further configured to:
- receive, in response to issuing the publisher identifier, metadata from the publisher device of the one or more publisher devices, wherein the metadata includes a name of the data category and further includes at least one of a data name, information about structure and semantics of the data payload, a data generation period or delivery schedule, a required quality of service, information about terms and conditions for subscription and security information;
- issue, based on the received metadata, the data identifier to the publisher device of the one or more publisher devices; and
- register the publisher device of the one or more publisher devices as a publisher for the data category.

In some embodiments, the mapping table stores the received publisher device identifier and the publisher identifier in association with each other.

In some embodiments, the mapping table stores the publisher identifier and the data identifier in association with each other.

In some embodiments, the mapping table stores the data identifier and the received metadata in association with each other.

In some embodiments, the circuitry of the broker device is further configured to receive metadata from the publisher device of the one or more publisher devices during registering as a publisher for the data category, wherein the metadata includes a name of the data category and further includes at least one of a data name, information about structure and semantics of the data payload, a data generation period or delivery schedule, a required quality of service, information about terms and conditions for subscription and security information.

In some embodiments, the circuitry of the broker device is further configured to transmit a the message describing sub-network within a network indicating that the internet-of-things network is in operation and assistance information to the plurality of subscriber devices, wherein the message describing sub-network within a network includes a network identifier of the internet-of-things and the assistance information includes the data identifier and at least one characteristic selected from the received metadata.

In some embodiments, the circuitry of the broker device is further configured to receive, in response to transmitting the message describing sub-network within a network and the assistance information, a subscriber registration request from the at least one subscriber device of the plurality of subscriber devices for registering as a subscriber for the data category, wherein the subscriber registration request includes a subscriber device identifier and the data identifier.

In some embodiments, the circuitry of the broker device is further configured to authenticate, in response to receiving the subscriber registration request, the at least one subscriber device of the plurality of publisher devices.

In some embodiments, the circuitry of the broker device is further configured to issue, if the at least one subscriber device of the plurality of subscriber devices is authenticated, a subscriber identifier to the at least one subscriber device of the plurality of subscriber devices.

In some embodiments, the circuitry of the broker device is further configured to register the at least one subscriber device of the plurality of subscriber devices as a subscriber for the data category, wherein the mapping table stores the data identifier and the subscriber identifier in association with each other as the relation between the data category and the subscriber for the data category.

In some embodiments, the mapping table stores the received subscriber device identifier and the subscriber identifier in association with each other.

In some embodiments, the data payload is transmitted to the at least one subscriber device of the plurality of subscriber devices in accordance with a data distribution policy for the data category of the data payload.

In some embodiments, the data distribution policy includes at least one of the data generation period or delivery schedule, the required quality of service and a priority.

In some embodiments, the data distribution policy includes a push-type data distribution or a pull-type data distribution.

In some embodiments, in a case of pull-type data distribution, the circuitry of the broker device is further configured to transmit a buffer status to the at, least one subscriber device of the plurality of subscriber devices, wherein the buffer status indicates whether the data payload is ready to be transmitted to the at least one subscriber device of the plurality of subscriber devices.

In some embodiments, the buffer status, indicating that the data payload is ready to be transmitted, is transmitted in response to a change of the buffer status.

In some embodiments, the circuitry of the broker device is further configured to:
receive a request for the buffer status from the at least one subscriber device of the plurality of subscriber devices; and
transmit the buffer status in response to the received request to the at least one subscriber device of the plurality of subscriber devices.

In some embodiments, the circuitry of the broker device is further configured, to receive a request for the data payload from the at least one subscriber device of the plurality of subscriber devices in response to transmitting the buffer status to the at least one subscriber device of the plurality of subscriber devices if the buffer status indicates that the data payload is ready to be transmitted.

In some embodiments, the data payload is transmitted in response to the received request for the data payload.

In some embodiments, in a case of push type data distribution, the data payload is transmitted periodically in accordance with a periodic wake-up window of the at least one subscriber device of the plurality of subscriber devices and, wherein the circuitry is further configured to store the published data temporarily in a buffer before the data payload is transmitted to the at least one subscriber device of the plurality of subscriber devices.

In some embodiments, the subscriber registration request includes an indication whether a sleep-state is supported, and wherein the mapping table stores the indication whether a sleep-state is supported and the subscriber device identifier in association with each other.

In some embodiments, in a case of push-type data distribution, the circuitry of the broker device is further configured to:
transmit a wake-up signal or, paging message to the at least one subscriber device of the plurality of subscriber devices if the sleep, state is supported, wherein the wake-up signal or the paging message is transmitted if the data payload is ready to be transmitted; and
transmit the data payload to the at least one subscriber device of the plurality of subscriber devices in response to transmitting the wake-up signal or the paging message.

In some embodiments, the circuitry of the broker device is further configured to store the published data temporarily in a buffer before the data payload is transmitted to the at least one subscriber device of the plurality of subscriber devices.

In some embodiments, the circuitry of the broker device is further configured to receive a transmission confirmation from the at least one subscriber device of the plurality of subscriber devices indicating whether the data payload is transmitted successfully.

In some embodiments, the mapping table stores a history of the at least one subscriber devices of the plurality of subscriber devices for the data category including the received data category and the received amount of data payload.

In some embodiments, the data payload and the data identifier are transmitted to the at least one subscriber device of the plurality of subscriber devices.

In some embodiments, the published data includes the publisher identifier, and the data payload, the data identifier and the publisher identifier are transmitted to the to at least one subscriber device of the plurality of subscriber devices.

Some embodiments pertain to a publisher device, for an internet-of-things network, the publisher device including circuitry including a communication interface, the circuitry being configured to communicate with a broker device via the communication interface, wherein the circuitry is further configured to:
transmit published data to the broker device at which the publisher device is registered as a publisher for a data category, wherein the published data includes data payload and a data identifier indicating the data category of the data payload.

The circuitry of the publisher device may include at least one of: a processor, a microprocessor, a dedicated circuit, a memory, a storage, a radio interface, a wireless interface, a network interface, or the like, e.g. typical electronic components to achieve the functions as described herein. The communication interface may include at least one of the radio interface, the wireless interface and the network interface supporting at least one of the communication technologies as described herein.

In some embodiments, the circuitry of the publisher device is further configured to receive a message describing sub-network within a network from the broker device indicating that the internet-of-things network is in operation, wherein the message describing sub-network within a network includes a network identifier of the internet-of-things network.

In some embodiments, the circuitry of the publisher device is further configured to transmit, in response to receiving the message describing sub-network within a network, a publisher registration to the broker device for registering as a publisher for the data category, wherein the publisher registration request includes a publisher device identifier.

In some embodiments, the circuitry of the publisher device is further configured to receive, if the publisher device is authenticated at the broker device, a publisher identifier.

In some embodiments, the circuitry of the publisher device is further configured to:
  transmit, in response to receiving the publisher identifier, metadata to the broker device, wherein the metadata includes a name of the data category and further includes at least one of a data name, information about structure and semantics of the data payload, a data generation period or delivery schedule, a required quality of service, information about terms and conditions for subscription and security information; and
  receive, as an indication for registering as a publisher for the data category at the broker device, the data identifier from the broker device.

Some embodiments pertain to a subscriber device for an internet-of-things network, the subscriber device including circuitry including a communication interface, the circuitry being configured to communicate with a broker device via the communication interface, wherein the circuitry is further configured to:
  receive at least data payload of published data from the broker device at which the subscriber device is registered as a subscriber for a data category, wherein the published data includes the data payload and a data identifier indicating the data category of the data payload.

The circuitry of the subscriber device may include at least one of: a processor, a microprocessor, a dedicated circuit, a memory, a storage, a radio interface, a wireless interface, a network interface, or the like, e.g. typical electronic components to achieve the functions as described herein. The communication interface may include at least one of the radio interface, the wireless interface and the network interface supporting at least one of the communication technologies as described herein.

In some embodiments, the circuitry of the subscriber device is further configured to receive a message describing sub-network within a network indicating that the internet-of-things network is in operation and assistance information from the broker device, wherein the message describing sub-network within a network includes a network identifier of the internet-of-things and the assistance information includes the data identifier and at least one characteristic selected from metadata-received at the broker device from a publisher device, wherein the metadata includes a name of the data category and further includes at least one of a data name, information about structure and semantics of the data payload, a data generation period or delivery schedule, a required quality of service, information about terms and conditions for subscription and security information.

In some embodiments, the circuitry of the subscriber device is further configured to transmit, in response to receiving the message describing sub-network within a network and the assistance information, a subscriber registration request to the broker device for registering as a subscriber for the data category, wherein the subscriber registration request includes a subscriber device identifier and the data identifier.

In some embodiments, the circuitry of the subscriber device is further configured to receive, if the subscriber device is authenticated at the broker device, a subscriber identifier from the broker device as an indication for registering as a subscriber for the data category at the broker device.

In some embodiments, the circuitry of the subscriber device is further configured to receive, in case of pull-type data distribution at the broker device for the data category of the data payload, a buffer status from the broker device, wherein the buffer status indicates whether the data payload is ready to be transmitted to the subscriber device.

In some embodiments, the circuitry of the subscriber device is further configured to:
  transmit, in case of pull-type data distribution at the broker device for the data category of the data payload, a request for the buffer status to the broker device; and
  receive the buffer status in response to the transmitted request from the broker device.

In some embodiments, the circuitry of the subscriber device is further configured to transmit a request for the data payload to the broker device in response to receiving the buffer status from the broker device if the buffer status indicates that the data payload is ready to be transmitted.

In some embodiments, the data payload is received in response to the transmitted request for the data payload.

In some embodiments, the circuitry of the subscriber device is further configured to receive, in a case of push type data distribution at the broker device for the data category of the data payload, the data payload periodically in accordance with a periodic wake-up window of the subscriber device.

In some embodiments, the subscriber registration request includes an indication whether a sleep-state is supported.

In some embodiments, in a case of push-type data distribution at the broker device for the data category of the data payload, the circuitry of the subscriber device is further configured to:
  receive a wake-up signal or paging message from the broker device if the sleep state is supported, wherein, the wake-up signal or the paging message is transmitted if the data payload is ready to be transmitted;
  transit from the sleep-state to a wake-up state; and
  receive the data payload from the broker device in response to receiving the wake-up signal or the paging message.

In some embodiments, the circuitry of the subscriber device is further configured to transmit a transmission confirmation to the broker device indicating whether the data payload is received successfully.

In some embodiments, wherein the data payload and the data identifier are received from the broker device.

In some embodiments, the published data includes a publisher identifier, and wherein the data payload, the data identifier and the publisher identifier are received from the broker device.

Some embodiments pertain to a publisher-subscriber system for an internet-of-things network, the publisher-subscriber system including:
  a broker device including circuitry having a communication interface configured to communicate with one or more publisher devices and a plurality of subscriber devices;

a publisher device of the one or more publisher devices including circuitry configured to communicate with the broker device;
a subscriber device of the plurality of subscriber devices including circuitry configured to communicate with the broker device;
wherein the circuitry of the publisher device is further configured to transmit published data to the broker device at which the publisher device is registered as a publisher for a data category, wherein the published data includes data payload and a data identifier indicating the data category of the data payload;
wherein the circuitry of the broker device is further configured to
receive the published data from a publisher device of the one or more publisher devices, and
transmit at least the data payload of the received published data to the subscriber device that is registered as a subscriber for the data category at the broker device; and
wherein the circuitry of the subscriber device is further configured to receive at least the data payload of the published data from the broker device.

Some embodiments pertain to a publisher-subscriber method for an internet-of-things network, the publisher subscriber method including:
receiving, at a broker device, published data from a publisher device of one or more publisher devices that is registered as a publisher for a data category at the broker device, wherein the published data includes data payload and a data identifier indicating the data category of the data payload; and
transmitting from the broker device at least the data payload of the received published data to at least one subscriber device of a plurality of subscriber devices that is registered as a subscriber for the data category at the broker device.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such, software control and a transmission, storage or other medium by which such a computer program is provided are envisaged as aspects of the present disclosure.

Note that the present technology can also be configured as described below.

(1) A broker device for an internet-of-things network, the broker device including circuitry including a communication interface, the circuitry being configured to communicate with one or more publisher devices and with a plurality of subscriber devices via the communication interface, wherein the circuitry is further configured to:
receive published data from a publisher device of the one or more publisher devices that is registered as a publisher for a data category at the broker device, wherein the published data includes data payload and a data identifier indicating the data category of the data payload; and
transmit at least the data payload of the received published data to at least one subscriber device of the plurality of subscriber devices that is registered as a subscriber for the data category at the broker device.

(2) The broker device of (1), wherein at least the data payload of the received published data is transmitted to the at least one subscriber device of the plurality of subscriber devices based on a mapping table kept at the broker device, wherein the mapping table stores at least a relation between the data category and the subscriber for the data category.

(3) The broker device of (1) or (2), wherein the circuitry is further configured to transmit a message describing sub-network within a network to the one or more publisher devices indicating that the internet-of-things network is in operation, wherein the message describing sub-network within a network includes a network identifier of the internet-of-things network.

(4) The broker device of (3), wherein the circuitry is further configured to receive, in response to transmitting the message describing sub-network within a network, a publisher registration request from the publisher device of the one or more publisher devices for registering as a publisher for the data category, wherein the publisher registration request includes a publisher device identifier.

(5) The broker device of (4), wherein the circuitry is further configured to authenticate, in response to receiving the publisher registration request, the publisher device of the one or more publisher devices.

(6) The broker device of (5), wherein the circuitry is further configured to issue, if the publisher device of the one or more publisher devices is authenticated, a publisher identifier to the publisher device of the one or more publisher devices.

(7) The broker device of (6), wherein the circuitry is further configured to:
receive, in response to issuing the publisher identifier, metadata from the publisher device of the one or more publisher devices, wherein the metadata includes a name of the data category and further includes at least one of a data name, information about structure and semantics of the data payload, a data generation period or delivery schedule, a required quality of service, information about terms and conditions for subscription and security information;
issue, based on the received metadata, the data identifier to the publisher device of the one or more publisher devices; and
register the publisher device of the one or more publisher devices as a publisher for the data category.

(8) The broker device of (6) or (7), wherein the mapping table stores the received publisher device identifier and the publisher identifier in association with each other.

(9) The broker device of (7) or (8), wherein the mapping table stores the publisher identifier and the data identifier in association with each other.

(10) The broker device of anyone of (7) to (9), wherein the mapping table stores the data identifier and the received metadata in association with each other.

(11) The broker device of anyone of (1) to (10), wherein the circuitry is further configured to receive metadata from the publisher device of the one or more publisher devices during registering as a publisher for the data category, wherein the metadata includes a name of the data category and further includes at least one of a data name, information about structure and semantics of the data payload, a data generation period or delivery schedule, a required quality of service, information about terms and conditions for subscription and security information.

(12) The broker device of (11), wherein the circuitry is further configured to transmit a message describing sub-network within a network indicating that the internet-of-things network is in operation and assistance information to the plurality of subscriber devices, wherein the message-describing sub-network within a network includes a network identifier of the internet-of-things and the assistance information includes the data identifier and at least one characteristic selected from the received metadata.

(13) The broker device of (12), wherein the circuitry is further configured to receive, in response to transmitting the network discovery signal and the assistance information, a subscriber registration request from the at least one subscriber device of the plurality of subscriber devices for registering as a subscriber for the data category, wherein the subscriber registration request includes a subscriber device identifier and the data identifier.

(14) The broker device of (13), wherein the circuitry is further configured to authenticate, in response to receiving the subscriber registration request, the at least one subscriber device of the plurality of publisher devices.

(15) The broker device of (14), wherein the circuitry is further configured to issue, if the at least one subscriber device of the plurality of subscriber devices is authenticated, a subscriber identifier to the at least one subscriber device of the plurality of subscriber devices.

(16) The broker device of (15), wherein the circuitry is further configured to register the at least one subscriber device of the plurality of subscriber devices as a subscriber for the data category, wherein the mapping table stores the data identifier and the subscriber identifier in association with each other as the relation between the data category and the subscriber for the data category.

(17) The broker device of (15) or (16), wherein the mapping table stores the received subscriber device identifier and the subscriber identifier in, association with each other.

(18) The broker device of anyone of (1) to (17), wherein the data payload is transmitted to the at least one subscriber device of the plurality of subscriber devices in accordance with a data distribution policy for the data category of the data payload.

(19) The broker device of anyone of (11) to (17) and (18), wherein the data distribution policy includes at least one of the data generation period or delivery schedule, the required quality of service and a priority.

(20) The broker device of (19), wherein the data distribution policy includes a push-type data distribution or a pull-type data distribution.

(21) The broker device of (20), wherein, in a case of pull-type data distribution, the circuitry is further configured to transmit a buffer status to the at least one subscriber device of the plurality of subscriber devices, wherein the buffer status indicates whether the data payload is ready to be transmitted to the at least one subscriber device of the plurality of subscriber devices.

(22) The broker device of (21), wherein the buffer status, indicating, that the data payload is ready to be transmitted, is transmitted in response to a change of the buffer status.

(23) The broker device of (21) or (22), wherein the circuitry is further configured to:
receive a request for the buffer status from the at least one subscriber device of the plurality of subscriber devices; and
transmit the buffer status in response to the received request to the at least one subscriber device of the plurality of subscriber devices.

(24) The broker device of anyone of (21) to (23), wherein the circuitry is further configured to receive a request for the data payload from the at least one subscriber device of the plurality of subscriber devices in response to transmitting the buffer status to the at least one subscriber device of the plurality of subscriber devices if the buffer status indicates that the data payload is ready to be transmitted.

(25) The broker device of (24), wherein the data payload is transmitted in response to the received request for the data payload.

(26) The broker device of anyone of (20) to (25), wherein, in a case of push type data distribution, the data payload is transmitted periodically in accordance with a periodic wake-up window of the at least one subscriber device of the plurality of subscriber devices and, wherein the circuitry is further configured to store the published data temporarily in a buffer before the data payload is transmitted to the at least one subscriber device of the plurality of subscriber devices.

(27) The broker device of anyone of (13) to (19) and anyone of (20) to (26), wherein the subscriber registration request includes an indication whether a sleep-state is supported, and wherein the mapping table stores the indication whether a sleep-state is supported, and the subscriber device identifier in association with each other.

(28) The broker device of (27), wherein, in a case of push-type data distribution, the circuitry is further configured to:
transmit a wake-up signal or paging message to the at least one subscriber device of the plurality of subscriber devices if the sleep state is supported, wherein the wake-up signal or the paging message is transmitted if the data payload is ready to be transmitted; and
transmit the data payload to the at least one subscriber device of the plurality of subscriber devices in response to transmitting the wake-up signal or the paging message.

(29) The broker device of anyone of (1) to (28), wherein the circuitry is further configured to store the published data temporarily in a buffer before the data payload is transmitted to the at least one subscriber device of the plurality of subscriber devices.

(30) The broker device of anyone of (1) to (29), wherein the circuitry is further configured to receive a transmission confirmation from the at least one subscriber device of the plurality of subscriber devices indicating whether the data payload is transmitted successfully.

(31) The broker device of anyone of (2) to (30), wherein the mapping table stores a history of the at least one subscriber devices of the plurality of subscriber devices for the data category including the received data category and the received amount of data payload.

(32) The broker device of anyone of (1) to (31), wherein the data payload and the data identifier are transmitted to the at least one subscriber device of the plurality of subscriber devices.

(33) The broker device of anyone of (6) to (32), wherein the published data includes the publisher identifier, and wherein the data payload, the data identifier and the publisher identifier are transmitted to the to at least one subscriber device of the plurality of subscriber devices.

(34) A publisher device for an internet-of-things network, the publisher device including circuitry including a communication interface, the circuitry being configured, to communicate with a broker device via the communication interface, wherein the circuitry is further configured to:
  transmit published data to the broker device at which the publisher device is registered as a publisher for a data category, wherein the published data includes data payload and a data identifier indicating the data category of the data payload.

(35) The publisher device of (34), wherein the circuitry is further configured to receive a message describing sub-network within a network from the broker device indicating that the internet-of-things network is in operation, wherein the message describing sub-network within a network includes a network identifier of the internet-of-things network.

(36) The publisher device of (35), wherein the circuitry is further configured to transmit, in response to receiving, the message describing sub-network within a network, a publisher registration to the broker device for registering as a publisher for the data category, wherein the publisher registration request includes a publisher device identifier.

(37) The publisher device of (36), wherein the circuitry is further configured to receive, if the publisher device is authenticated at the broker device, a publisher identifier.

(38) The publisher device of (37), wherein the circuitry is further configured to:
  transmit, in response to receiving the publisher identifier, metadata to the broker device, wherein the metadata includes a name of the data category and further includes at least one of a data name, information about structure and semantics of the data payload, a data generation period or delivery schedule, a required quality of service, information about terms and conditions for subscription and security information; and
  receive, as an indication for registering as a publisher for the data category at the broker device, the data identifier from the broker device.

(39) A subscriber device for an internet-of-things network, the subscriber device including circuitry including a communication interface, the circuitry being configured to communicate with a broker device via the communication interface, wherein the circuitry is further configured to:
  receive at least data payload of published data from the broker device at which the subscriber device is registered as a subscriber for a data category, wherein the published data includes the data payload and a data identifier indicating the data category of the data payload.

(40) The subscriber device of (39), wherein the circuitry is further configured to receive a message describing sub-network within a network indicating that the internet-of-things network is in operation and assistance information from the broker device, wherein the network discovery signal includes a network identifier of the internet-of-things and the assistance information includes the data identifier and at least one characteristic selected from metadata received at the broker device from a publisher device, wherein the metadata includes a name of the data category and further includes at least one of a data name, information about structure and semantics of the data payload, a data generation period or delivery schedule, a required quality of service, information about terms and conditions for subscription and security information.

(41) The subscriber device of (40), wherein the circuitry is further configured to transmit, in response to receiving the message describing sub-network within a network and the assistance information, a subscriber registration request to the broker device for registering as a subscriber for the data category, wherein the subscriber registration request includes a subscriber device identifier and the data identifier.

(42) The subscriber device of (40) or (41), wherein the circuitry is further configured to receive, if the subscriber device is authenticated at the broker device, a subscriber identifier from the broker device as an indication for registering as a subscriber for the data category at the broker device.

(43) The subscriber device of anyone of (39) to (42), wherein the circuitry is further configured to receive, in case of pull-type data distribution at the broker device for the data category of the data payload, a buffer status from the broker device, wherein the buffer status indicates whether the data payload is ready to be transmitted to the subscriber device.

(44) The subscriber device of (43), wherein the circuitry is further configured to:
  transmit, in case of pull-type data distribution at, the broker device for the data category of the data payload, a request for the buffer status to the broker device; and
  receive the buffer status in response to the transmitted request from the broker device.

(45) The subscriber device of (43) or (44), wherein the circuitry is further configured to transmit a request for the data payload to the broker device in response to receiving the buffer status from the broker device if the buffer status indicates that the data payload is ready to be transmitted.

(46) The subscriber of (45), wherein the data payload is received in response to the transmitted request for the data payload.

(47) The subscriber device of anyone of (39) to (46), wherein the circuitry is further configured to receive, in a case of push type data distribution at the broker device for the data category of the data payload, the data payload periodically in accordance with a periodic wake-up window of the subscriber device.

(48) The subscriber device of anyone of (41) to (47), wherein the subscriber registration request includes an indication whether a sleep-state is supported.

(49) The subscriber device of (48), wherein, in a case of push-type data distribution at the broker device for the data category of the data payload, the circuitry is further configured to:
  receive a wake-up signal or paging message from the broker device if the sleep state is supported, wherein the wake-up signal or the paging message is transmitted if the data payload is ready to be transmitted;
  transit from the sleep-state to a wake-up state; and
  receive the data payload from the broker device in response to receiving the wake-up signal or the paging message.

(50) The subscriber device of anyone of (39) to (49), wherein the circuitry is further configured to transmit a transmission confirmation to the broker device indicating whether the data payload is received successfully.

(51) The subscriber device of anyone of (39) to (50), wherein the data payload and the data identifier are received from the broker device.

(52) The subscriber device of anyone of (39) to (51), wherein the published data includes a publisher identifier, and wherein the data payload, the data identifier and the publisher identifier are received from the broker device.

(53) A publisher-subscriber system for an internet-of-things network, the publisher-subscriber system including:
- a broker device including circuitry having a communication interface configured to communicate with one or more publisher devices and a plurality of subscriber devices;
- a publisher device of the one or more publisher devices including circuitry configured to communicate with the broker device;
- a subscriber device of the plurality of subscriber devices including circuitry configured to communicate with the broker device;
- wherein the circuitry of the publisher device is further configured to transmit published data to the broker device at which the publisher device is registered as a publisher for a data category, wherein the published data includes data payload and a data identifier indicating the data category of the data payload;
- wherein the circuitry of the broker device is further configured to
  - receive the published data from the publisher device of the one or more publisher devices, and
  - transmit at least the data payload of the received published data to the subscriber device that is registered as a subscriber for the data category at the broker device; and
- wherein the circuitry of the subscriber device is further configured to receive at least the data payload of the published data from the broker device.

(54) A publisher-subscriber method for an internet-of-things network, the publisher subscriber method including:
- receiving, at a broker device, published data from a publisher device of one or more publisher devices that is registered as a publisher for a data category at the broker device, wherein the published data includes data payload and a data identifier indicating the data category of the data payload; and
- transmitting from the broker device at least the data payload of the received published data to at least one subscriber device of a plurality of subscriber devices that is registered as a subscriber for the data category at the broker device, wherein the mapping table stores at least a relation between the data category and the subscriber for the data category.

(55) A computer program comprising program code causing a computer to perform the method according to (54), when being carried out on a computer.

(56) A non-transitory computer-readable recording medium that stores therein a computer program product, which, when executed by a processor, causes the method according to (54) to be performed.

The invention claimed is:

1. A broker device for an internet-of-things network, the broker device comprising circuitry including a communication interface, the circuitry being configured to communicate with one or more publisher devices and with a plurality of subscriber devices via the communication interface, wherein the circuitry is further configured to:
   receive published data from a publisher device of the one or more publisher devices that is registered as a publisher for a data category at the broker device, wherein the published data includes data payload and a data identifier indicating the data category of the data payload,
   temporarily store the published data in a buffer,
   receive, from at least one subscriber device of the plurality of subscriber devices, a request for a buffer status, wherein the buffer status indicates whether the data payload is ready to be transmitted,
   in response to the request, transmit the buffer status to the at least one subscriber device of the plurality of subscriber devices,
   transmit at least the data payload of the received published data to the at least one subscriber device of the plurality of subscriber devices that is registered as a subscriber for the data category at the broker device,
   authenticate, in response to receiving a publisher registration request, the publisher device of the one or more publisher devices, and
   issue, if the publisher device of the one or more publisher devices is authenticated, a publisher identifier to the publisher device of the one or more publisher devices.

2. The broker device according to claim 1, wherein at least the data payload of the received published data is transmitted to the at least one subscriber device of the plurality of subscriber devices based on a mapping table kept at the broker device, wherein the mapping table stores at least a relation between the data category and the subscriber for the data category.

3. The broker device according to claim 1, wherein the circuitry is further configured to transmit a message describing sub-network within a network to the one or more publisher devices indicating that the internet-of-things network is in operation, wherein the message describing sub-network within a network includes a network identifier of the internet-of-things network.

4. The broker device according to claim 3, wherein the circuitry is further configured to receive, in response to transmitting the message describing sub-network within a network, a publisher registration request from the publisher device of the one or more publisher devices for registering as a publisher for the data category, wherein the publisher registration request includes a publisher device identifier.

5. The broker device according to claim 4, wherein the circuitry is further configured to:
   receive, in response to issuing the publisher identifier, metadata from the publisher device of the one or more publisher devices, wherein the metadata includes a name of the data category and further includes at least one of a data name, information about structure and semantics of the data payload, a data generation period or delivery schedule, a required quality of service, information about terms and conditions for subscription and security information;
   issue, based on the received metadata, the data identifier to the publisher device of the one or more publisher devices; and
   register the publisher device of the one or more publisher devices as a publisher for the data category.

6. The broker device according to claim 4, wherein the mapping table stores the received publisher device identifier and the publisher identifier in association with each other.

7. The broker device according to claim 1, wherein the circuitry is further configured to receive metadata from the publisher device of the one or more publisher devices during registering as a publisher for the data category, wherein the metadata includes a name of the data category and further includes at least one of a data name, information about structure and semantics of the data payload, a data generation period or delivery schedule, a required quality of service, information about terms and conditions for subscription and security information.

8. The broker device according to claim 7, wherein the circuitry is further configured to transmit a message describing sub-network within a network indicating that the internet-of-things network is in operation and assistance information to the plurality of subscriber devices, wherein the message describing sub-network within a network includes a network identifier of the internet-of-things and the assistance information includes the data identifier and at least one characteristic selected from the received metadata.

9. A publisher device for an internet-of-things network, the publisher device comprising circuitry including a communication interface, the circuitry being configured to communicate with a broker device via the communication interface, wherein the circuitry is further configured to:
  transmit published data to the broker device at which the publisher device is registered as a publisher for a data category, wherein the published data includes data payload and a data identifier indicating the data category of the data payload, wherein the published data transmitted to the broker device is temporarily stored in a buffer at the broker device prior to being transmitted to at least one subscriber device in response to a request for a buffer status, wherein the buffer status indicates whether the data payload is ready to be transmitted,
  transmit, in response to receiving a message describing a sub-network within a network, a publisher registration to the broker device for registering as a publisher for the data category, wherein the publisher registration request includes a publisher device identifier, and
  receive, if the publisher device is authenticated at the broker device, a publisher identifier.

10. The publisher device according to claim 9, wherein the circuitry is further configured to receive the message describing the sub-network within the network from the broker device indicating that the internet-of-things network is in operation, wherein the message describing the sub-network within the network includes a network identifier of the internet-of-things network.

11. The publisher device according to claim 10, wherein the circuitry is further configured to:
  transmit, in response to receiving the publisher identifier, metadata to the broker device, wherein the metadata includes a name of the data category and further includes at least one of a data name, information about structure and semantics of the data payload, a data generation period or delivery schedule, a required quality of service, information about terms and conditions for subscription and security information; and
  receive, as an indication for registering as a publisher for the data category at the broker device, the data identifier from the broker device.

12. A subscriber device for an internet-of-things network, the subscriber device comprising circuitry including a communication interface, the circuitry being configured to communicate with a broker device via the communication interface, wherein the circuitry is further configured to:
  receive at least data payload of published data from the broker device at which the subscriber device is registered as a subscriber for a data category, wherein the published data includes the data payload and a data identifier indicating the data category of the data payload,
  transmit, in response to receiving a message describing a sub-network within a network and assistance information, a subscriber registration request to the broker device for registering as a subscriber for the data category, wherein the subscriber registration request includes a subscriber device identifier and the data identifier,
  receive, if the subscriber device is authenticated at the broker device, a subscriber identifier from the broker device as an indication for registering as a subscriber for the data category at the broker device,
  transmit, to the broker device, a request for a buffer status, wherein the buffer status indicates whether the data payload is ready to be transmitted, and
  in response to transmitting the request, receive the buffer status from the broker device.

13. The subscriber device according to claim 12, wherein the circuitry is further configured to receive the message describing the sub-network within a network indicating that the internet-of-things network is in operation and the assistance information from the broker device, wherein the network discovery signal includes a network identifier of the internet-of-things and the assistance information includes the data identifier and at least one characteristic selected from metadata received at the broker device from a publisher device, wherein the metadata includes a name of the data category and further includes at least one of a data name, information about structure and semantics of the data payload, a data generation period or delivery schedule, a required quality of service, information about terms and conditions for subscription and security information.

* * * * *